June 19, 1951     M. S. BAKER     2,557,529
POWER TRANSMITTING DEVICE
Filed Sept. 28, 1946     4 Sheets-Sheet 3
FIG. 3.
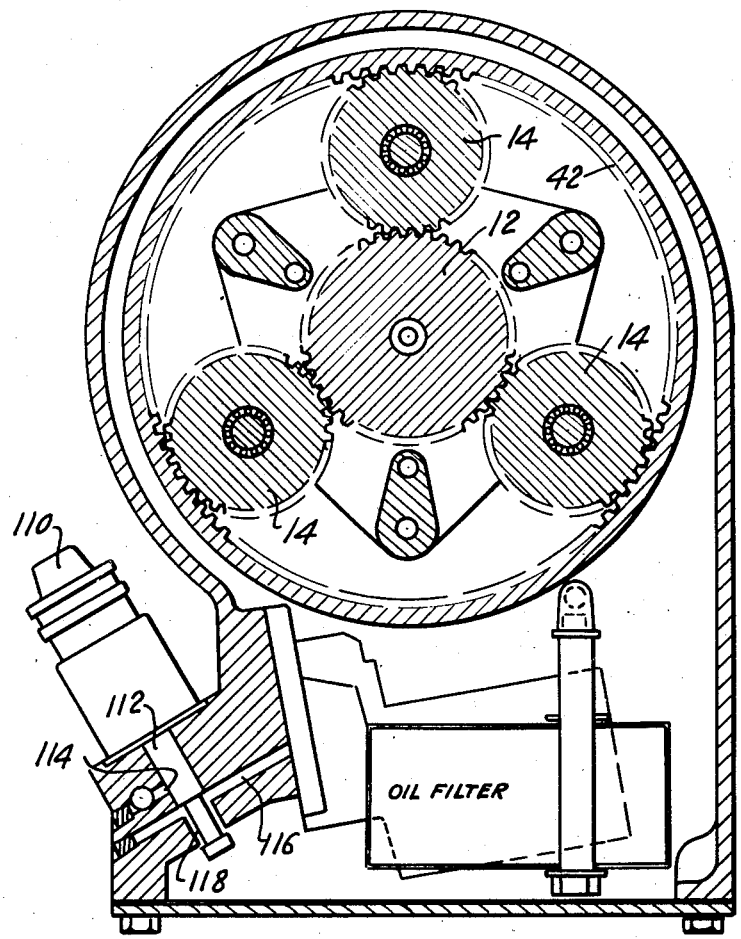
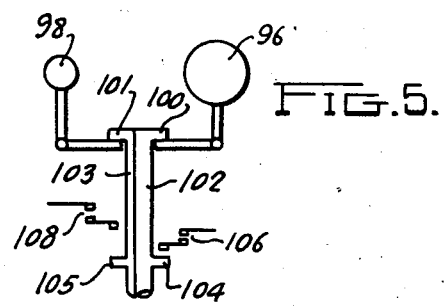
FIG. 5.
INVENTOR.
BY Malvern S. Baker
Hauke & Hardesty
ATTORNEYS June 19, 1951    M. S. BAKER    2,557,529
POWER TRANSMITTING DEVICE
Filed Sept. 28, 1946    4 Sheets-Sheet 4

INVENTOR.
BY Malvern S. Baker
Hauke & Hardest
ATTOR*

Patented June 19, 1951

2,557,529

UNITED STATES PATENT OFFICE 2,557,529

POWER TRANSMITTING DEVICE

Malvern S. Baker, Muskegon, Mich., assignor to Continental Motors Corporation, Muskegon, Mich., a corporation of Virginia Application September 28, 1946, Serial No. 700,096

5 Claims. (Cl. 74—752)

This invention relates to devices for transmitting mechanical power or torque, especially to transmissions for automotive vehicles.

In automotive vehicles powered by internal combustion engines, it is necessary that the engine run at a relatively high speed compared to the propeller shaft speed, when the vehicle is started from a stationary position. As the vehicle picks up speed, the ratio of engine speed to propeller shaft speed may gradually be reduced to unity. In conventional transmissions, this is accomplished in a series of steps, but in shifting from one step to another, the connection with the engine is broken.

It is an object of this invention to provide a transmission for automotive vehicles in which the ratio of engine speed to propeller shaft speed may be changed gradually and automatically from infinity to unity without interrupting the connection between the engine and the propeller shaft. This is accomplished in a transmission having a fluid clutch and a planetary gear train, with a ring gear combined with the planetary gear train. Shifting is accomplished automatically by speed and torque responsive controls.

In the drawings:

Fig. 3 is a view in section on line 3—3 of Fig. 1.

Fig. 4 is a view in section on line 4—4 of Fig. 1. Note that, whereas Figs. 2 and 3 are on sections looking toward the front end of the transmission, Fig. 4 is a section looking toward the rear of the transmission.

Fig. 5 is a diagrammatic view of the speed governor used in controlling the transmission.

Figure 1:
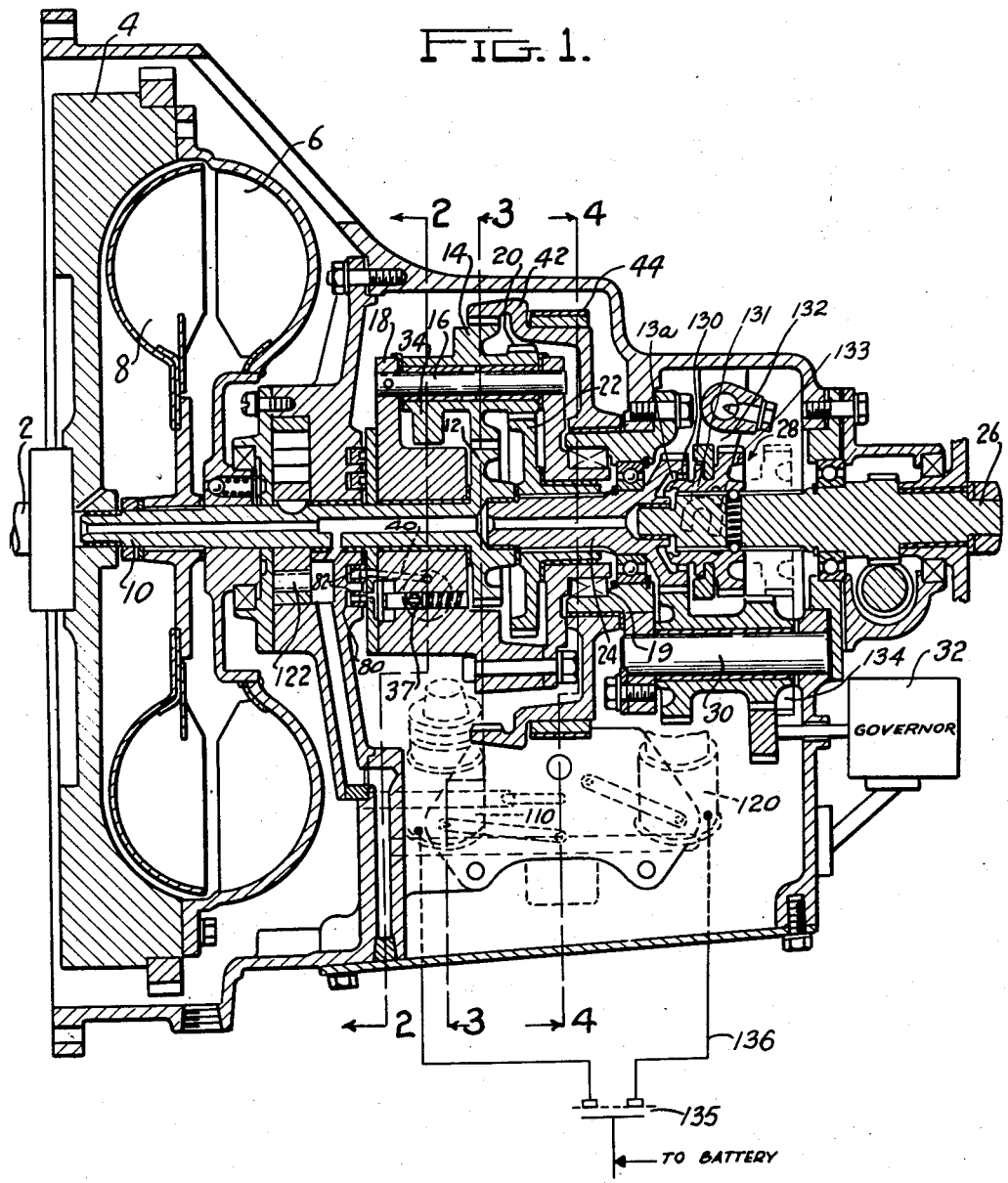
Fig. 1 is a longitudinal sectional view of a transmission made according to the invention.

A crank shaft 2 is shown coupled to a fly wheel 4, which has bolted or otherwise secured thereto the impeller half 6 of a fluid clutch. The runner 8 of the clutch is splined to shaft 10. Integral with shaft 10 is a power gear 12. Power gear 12 is the input sun gear of a planetary gear train having at least one planet gear 14 mounted to rotate about its own axis on the shaft 16. As can be seen in Fig. 3, the preferred embodiment shows three planet gears 14. A planet carrier 18 mounts the shaft 16 and planet gear 14 so as to be rotatable about the axis of shaft 10 and sun gear 12. Planet carrier 18 is secured against rotation in a direction opposite to the normal direction of rotation of power gear 12 by any suitable type of one-way brake such as the one shown at 19.

Planet gear 20 is integral with the gear 14 and meshes with the output sun gear 22 mounted on output shaft 24. Output shaft 24 is connected to propeller shaft 26 through a reversing gear train indicated generally at 28. A counter shaft 30 of the reversing gear train is connected to drive governor 32. The details of governor 32 need not be disclosed here because this governor may be any of a number of satisfactory speed responsive devices. For purposes of illustration the details of governor 32 are shown schematically in Fig. 5 and will be described later.

Planet gears 14 and 20 are integral with each other and eccentric cam 34. As can be seen in Fig. 2 there are, of course, three of these eccentric cams 34, one for each pair of planet gears. Cams 34 operate on pistons 36. The pistons 36 are arranged in opposed pairs; the two pistons of a given pair communicate with each other through a passage 37. Another passage, closed by a double acting check valve 38, is provided to admit fluid to the cylinders. Fluid is supplied to the cylinders into ports associated with check valves 38, through a passage shown in dotted lines at 40 connected with a suitable source of fluid pressure supply, Fig. 1. It will not be necessary to go into greater detail in the explanation of the eccentric cams and their cooperating pistons, because this portion of the invention has been described and claimed in a separate application Serial No. 693,938 filed August 30, 1946, now Patent No. 2,471,668, issued May 31, 1949, and assigned to the assignee of this invention.

Figure 4:
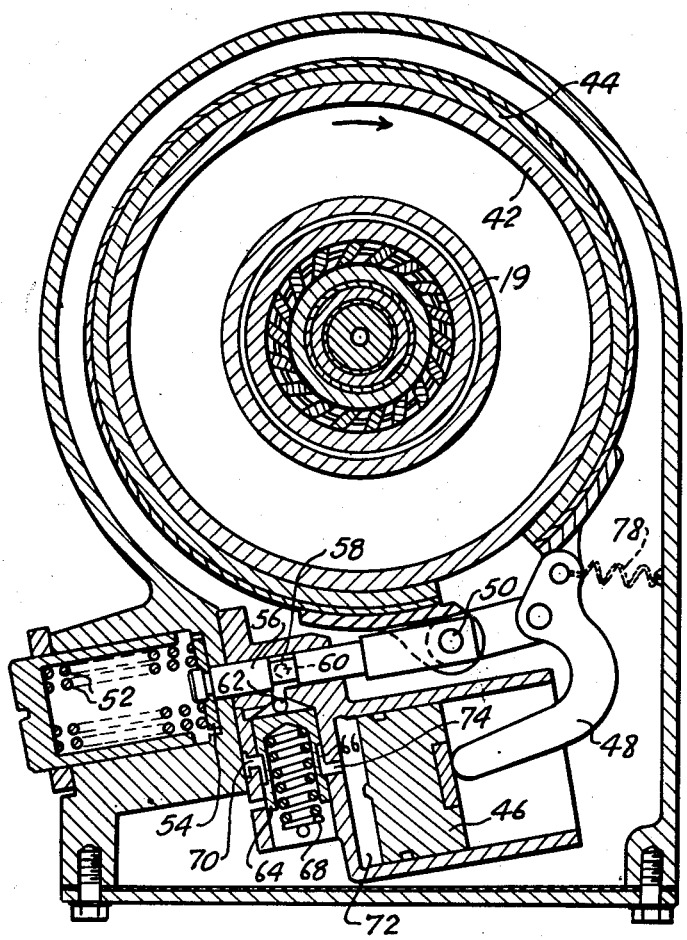

A ring gear 42 is rotatably mounted on the transmission casing and is free to rotate about the axes of the sun gears and meshes with the planet gears 14. A brake 44 is applied to ring gear 42 in order to hold the ring gear against rotation during certain phases of operation of the transmission. As is best seen in Fig. 4 brake 44 is energized by piston 46 operating against link 48. The other end of brake 44 is anchored to a pin 50 which is biased into brake actuating position by spring 52 working against plate 54. Plate 54 is connected to support the pin 50 by means of a valve-forming shaft or piston 56, having a reduced portion 58. With the reduced portion 58 in the position shown in Fig. 4, communication is provided between ports 60 and 62 and the top of valve 64. Valve 64 is circumferentially grooved as shown at 66, and is biased into the position shown by spring 68, and in this position port 70 communicates with cylinder 72 by means of port 74. In the position of valve 64 shown in Fig. 7 groove 66 communicates with port 74 and with port 76 to let fluid out of cylinder 72. A spring 78 is shown diagrammatically and may be any suitable spring, shown here as being in tension, for the purpose of retracting brake 44 to release ring gear 42.

Figure 2:
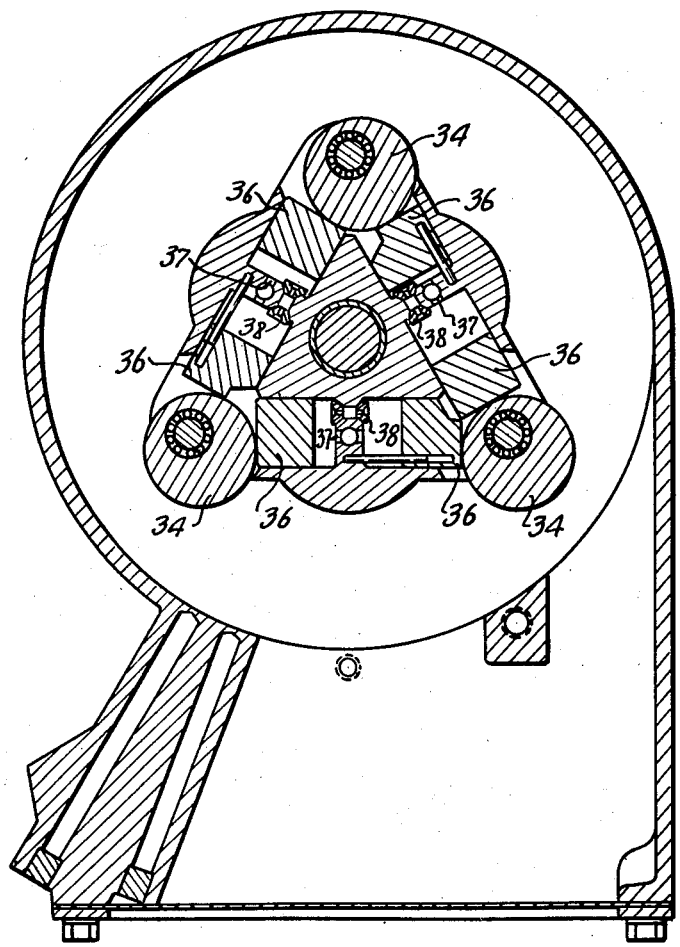
Fig. 2 is a view in section on line 2—2 of Fig. 1.
Figure 6:
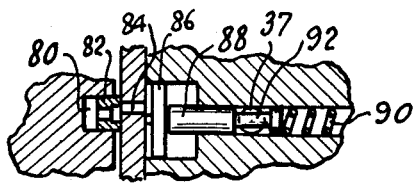
Fig. 6 is an enlarged detail view of a portion of Fig. 1.

Port 62 communicates with the eccentric cam and piston system of Fig. 2 by means of conventional drilled passages to annular space 80, sealing ring 82, and port 84 (see Figs. 1 and 6). As is best shown in Fig. 6, fluid admitted through port 84 acts against a large diameter piston 86 which in turn actuates a small piston valve 88 against the bias of spring 90. Piston valve 88 has a reduced section 92 which, in Fig. 1 and 6, is shown opposite the passage 37. Passage 37 is the passage which communicates with opposed cylinders of Fig. 2. When piston valve 88 is moved to the right from the position shown in Fig. 6, communication between the cylinders of Fig. 2 is cut off and pistons 36 are held from movement, thus locking the planet gears against rotation about their own axes.

As seen diagrammatically in Fig. 5, governor 32 comprises two fly balls, a large ball 96 and a smaller ball 98 mounted to operate against collars 100 and 101 respectively of shafts 102 and 103 respectively. A second pair of collars 104 and 105 is provided to close contacts 106 and 108 serially. A solenoid operated valve 110 is connected to be energized by the closing of contacts 106; with solenoid 110 energized, piston or plunger 112 is raised permitting the communication of passage 114 with passage 116 by way of the reduced section 118 of plunger 112. Passage 116 communicates with port 70 (Fig. 4) to cause the actuation of piston 46.

Solenoid operated valve 120 is connected to be energized by the closing of contacts 108 of the governor, thereby placing pasage 114 into communication with a valve passage and discharge passage similar in construction to 118 and 116, thence through conventional drilled passages in the transmission case to annular chamber 80, and since port 60 is arranged in open communication with chamber 80, fluid under pressure is conducted through port 60 to the top side of valve 64.

The fluid used may be engine lubricating oil or a separate transmission sump oil circulated through the system by any suitable pump such as the gear pump shown at 122, Fig. 1.

*Operation*

With the vehicle power plant or engine in operation, there is no drive through the transmission to the output shaft 26. The flywheel 4 driven by the engine rotates and applies a low torque drive to the runner 8 through the fluid clutch pump 6, runner 8 is splined to shaft 10 and thus rotates input sun gear 12. The pinion gears 14 are in mesh with the input sun gear 12 and the gears 14, ring gear 42 and output sun gear 22 are rotated freely due to the relation of clutch 130, on which is splined the output sun gear 22, with respect to the output forward and reverse transmission, which is in a neutral position on starting the engine.

Fig. 1 shows the shifting sleeve 131 carrying clutch 130a shifted to the left and engaged with clutch 130 for forward operation. Sleeve 131 is moved to the right by shift lever 132 to disengage 130a and 130 for neutral position and is moved further to the right, as seen in Fig. 1, to engage the gear 133 carried by sleeve 131 with gear 134 which is in mesh with the reverse gear assembly carried by shaft 30, for reverse operation.

To start operation in either forward or reverse direction, it is necessary to lock the freely rotating elements against rotation so that the clutch 130a or gear 133 may mesh wih clutch 130 or gear 134 respectively without clashing. This mechanical operation contemplates the inclusion of a manually operated switch 135 in an independent circuit 136 to the solenoids. Thus by closing switch 135 both solenoids are energized, thereby locking ring gear 42 against rotation by applying the brake 44 and planet gear 14 is so locked against rotation by means of the mechanism showing in Fig. 2. After the shiftable sleeve 131 is moved to engage clutch 130a or gear 133 to gear 134 for either forward or reverse operation respectively, the switch 135 is opened allowing the transmission unit to operate automatically as hereafter described.

The above mentioned manually operated circuit 136 is independent of the circuit illustrated in Fig. 5 which is employed for energizing the solenoids in the automatic operation of the transmission.

In low gear brake 44 is off, planet carrier 18 is held against rotation by one-way brake 19. Ring gear 42 simply idles in a direction opposite to the normal forward direction of power gear 12.

When the vehicle reaches a predetermined speed, ball 96 of the governor closes contacts 106, energizing solenoid 110 to admit fluid into cylinder 72, forcing piston 46 to actuate or set brake 44. The ring gear is now held stationary and the planet carrier rotates in the same direction as the power gear, being released by the one-way brake.

Figure 7:
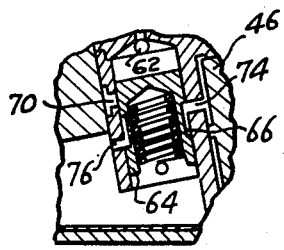
Fig. 7 is a view of a portion of Fig. 4 showing the timing valve in a different operating position.

At a second, higher, predetermined vehicle speed, the small ball 98 closes the contacts 108, energizing solenoid 120 to admit fluid to port 60 (Fig. 4). However, further automatic forward operation is now to be controlled by the torque responsive means illustrated in Fig. 4. At the time when a shift from intermediate drive to direct drive is made, the torque reaction which has previously been relatively high so that valve 56 was moved to the left compressing spring 52 and port 60 is closed by the valve body. But as the torque reaction decreases, spring 52 urges valve 56 to the right and the reduced section 58 of valve body is moved into registration with port 60, thereby opening port 60 so that fluid passes to port 62, thence to annular groove or chamber 80 which is connected by conventional drilled passages in the casing with said port 62. The fluid pressure is then communicated through port 84, forcing piston valve 88 to the right to close passages 37 (Fig. 2). At substantially the same time, this same fluid pressure is communicated on top of piston or valve 64 and thus urges valve 64 against spring 68 to a position shown in Fig. 7 thereby venting piston chamber 72 and releasing brake 44. Since passages 37 are now closed, the planet gears are held against rotation about their own axes, and thus making the planetary gear train operate as a unit as described in the Patent No. 2,471,668. As shown in Fig. 7, communication between ports 70 and 74 is cut off and piston chamber 72 is ported to the sump by means of reduced section 66 and port 76. Thereupon piston 46 releases link 48 and spring 78 pulls the brake 44 out of engagement with ring gear 42 to allow for direct drive operation as described above.

The foregoing description of the operation of the shift from intermediate to direct drive is based on the assumption that the piston valve 56 occupies the position shown in Fig. 4. Attention is again directed to the fact that the position of piston valve 56 is determined by a balance between the pull on anchor 50 exerted by brake 44 and the reaction of torque spring 52. Inasmuch as brake 44 holds ring gear 42 against rotation, the pull on anchor 50 will be determined by the torque tending to rotate the ring gear 42 in the direction shown by the arrow in Fig. 4. This torque is determined by the load on the output shaft. If the torque is high, torque spring 52 is compressed by movement of plate 54 and moves piston valve 56 to the left to close off port 60. So long as the torque remains high enough to keep port 60 covered, no fluid can communicate with the pistons to stop rotation of the eccentric cams (Fig. 2), and no fluid pressure is available to move timing valve 64 from its position in Fig. 4 to its position in Fig. 7. The result is that brake 44 remains energized, or "on," until the torque has been sufficiently reduced to restore the piston valve 56 to the position shown in Fig. 4.

As vehicle speed is reduced the transmission shifts from direct drive into intermediate gear and from intermediate gear into low gear. In this direction, however, both shifts are made in response to speed alone. As the speed is reduced, the small ball 98 of governor 32 responds to spring pressure and permits contacts 108 to open, de-energizing solenoid 120, thus relieving the pressure on pistons 36 (Fig. 2) permitting eccentric cams 34 to rotate; at the same time, timing valve 64 is restored by spring 68 to the position shown in Fig. 4. Inasmuch as contacts 106 of the governor are still closed, brake 44 is immediately energized, stopping rotation of ring gear 42, and the transmission is in intermediate gear.

As the vehicle speed continues to fall, ball 96 of the governor responds to spring pressure permitting contacts 106 to open, and solenoid 110 is de-energized, again releasing brake 44. The transmission is then in low gear.

I claim:

1. In a transmission, an input sun gear, an output sun gear, a duplex planet gear meshing with said sun gears, a rotatable mounting means for the planet gear whereby the same may rotate about its own axis and the axis of the planet gear may rotate about the sun gears, a ring gear meshing with the planet gear and rotatable substantially coaxially with the sun gears, speed responsive means operative to hold the ring gear against rotation at a predetermined speed, fluid actuated means operable to lock the planet gears against rotation and thereby cause said sun gears to rotate together, and means responsive to a torque reaction on said ring gear to control said fluid actuated means.

2. In a transmission, an input sun gear, an output sun gear, a duplex planet gear meshing with said sun gears, a rotatable mounting means for the planet gear whereby the same may rotate about its own axis and the axis of the planet gear may rotate about the sun gears, a ring gear meshing with the planet gear and rotatable substantially coaxially with the sun gears, speed responsive means operative to hold the ring gear against rotation at a predetermined speed, fluid actuated means operable to lock the planet gears against rotation and thereby said sun gears to rotate together, and means responsive to a torque reaction on said ring gear to control the admission of fluid under pressure to said fluid actuated means.

3. In a transmission, an input sun gear, an output sun gear, a duplex planet gear meshing with said sun gears, a rotatable mounting means for the planet gear whereby the same may rotate about its own axis and the axis of the planet gear may rotate about the sun gears, a ring gear meshing with the planet gear and rotatable substantially coaxially with the sun gears, speed responsive means operative to hold the ring gear against rotation at a predetermined speed, fluid actuated means operable to lock the plane gears against rotation and thereby cause said sun gears to rotate together, and means responsive to a torque reaction on said ring gear to control the operation of said fluid actuated device.

4. In a transmission, an input sun gear, an output sun gear, a duplex planet gear meshing with said sun gears, a rotatable mounting means for the planet gear whereby the same may rotate about its own axis and the axis of the planet gear may rotate about the sun gears, a ring gear meshing with the planet gear and rotatable substantially coaxially with the sun gears, speed responsive means operative to hold the ring gear against rotation at a predetermined speed, fluid actuated means operable to lock the planet gears against rotation about their axes and thereby cause said sun gears to rotate together, and means responsive to a torque reaction on said ring gear to control said fluid actuated means, said last mentioned means comprising a spring biased valve member operable to control the admission of fluid under pressure to the aforesaid fluid actuated means, said valve movable to open position when subjected to a predetermined torque reaction and to a closed position when said torque reaction exceeds said predetermined amount.

5. In a transmission, an input sun gear, an output sun gear, a duplex planet gear meshing with said sun gears, a rotatable mounting means for the planet gear whereby the same may rotate about its own axis and the axis of the planet gear may rotate about the sun gears, a ring gear meshing with the planet gear and rotatable substantially coaxially with the sun gears, speed responsive means operative to hold the ring gear against rotation at a predetermined speed, fluid actuated means operable to lock the planet gears against rotation about their own axes and thereby cause said sun gears to rotate together, and means responsive to a torque reaction on said ring gear to control said fluid actuated means, said means holding the ring gear against rotation comprising a brake, a piston movable by fluid pressure to apply the brake, and a valve controlling application of fluid pressure to said piston, said torque responsive means comprising a spring biased valve operable to substantially simultaneously admit fluid under pressure to actuate said means locking the planet gears against rotation and to actuate said first mentioned valve to relieve the fluid pressure action on said piston to release the brake, said spring biased valve movable to open position when subjected to a predetermined torque reaction and to a closed position when said torque reaction exceeds said predetermined amount.

MALVERN S. BAKER.

REFERENCES CITED

The following references are of record in the file of this patent:

UNITED STATES PATENTS

| Number | Name | Date |
|---|---|---|
| 953,992 | Folberth | Apr. 5, 1910 |
| 2,068,437 | Starr | Jan. 19, 1937 |
| 2,074,781 | Duffield | Mar. 23, 1937 |
| 2,153,796 | Fletcher | Apr. 11, 1939 |
| 2,409,506 | McFarland | Oct. 15, 1946 |
| 2,410,921 | Avila | Nov. 12, 1946 |
| 2,471,669 | Baker | May 31, 1949 |

FOREIGN PATENTS

| Number | Country | Date |
|---|---|---|
| 747,218 | France | June 13, 1933 |